June 16, 1953 F. W. BRAENDEL 2,641,948
DRIVER TOOL FOR SELF-TAPPING INSERT
Filed Jan. 9, 1951
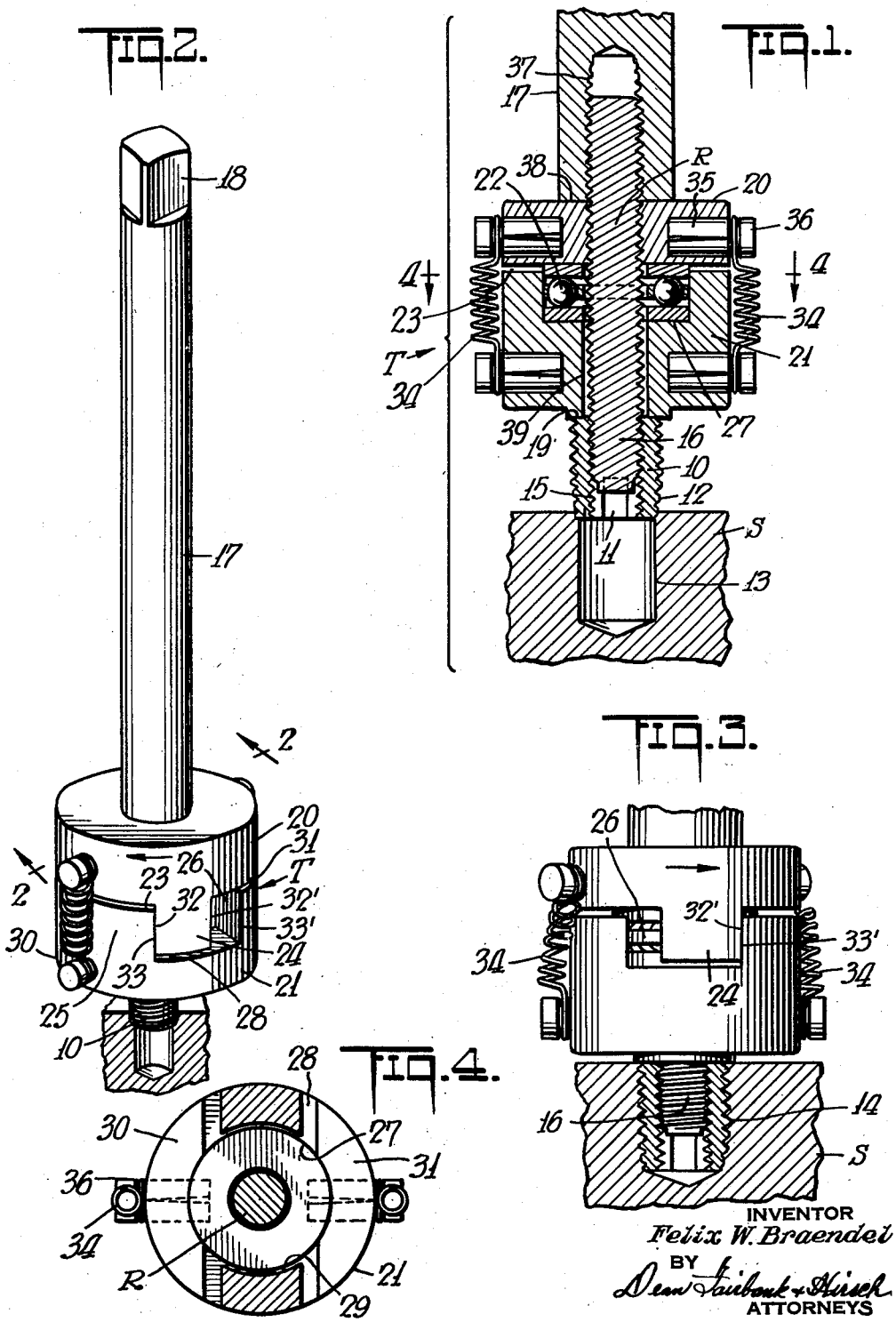
INVENTOR
*Felix W. Braendel*
BY
*Dean Fairbank + Hirsch*
ATTORNEYS Patented June 16, 1953

2,641,948

UNITED STATES PATENT OFFICE 2,641,948

DRIVER TOOL FOR SELF-TAPPING INSERTS

Felix W. Braendel, Teaneck, N. J., assignor to Groov-Pin Corporation, a corporation of New York Application January 9, 1951, Serial No. 205,094

7 Claims. (Cl. 81—53)

The present invention is concerned with tools for the application of self-tapping screw mounting inserts into untapped bores of plastic and metal structures.

As conducive to a clear understanding of the invention, it is noted that the relatively high tapping torque required for introducing a self-tapping insert of harder metal into a bore in a softer structure, such as aluminum, plastic or the like, and driving it home frequently causes the driver tool to become so tightly locked against the exposed end of the insert that the reverse torque applied to the driver tool for removal is not always effective to unscrew it from the installed insert, but rather moves the insert with the tool for release and withdrawal from the structure in which it was installed.

It is accordingly among the objects of the invention to provide a driver tool for the above purpose, which is simple, rugged and inexpensive in construction and which requires no special skill or technique for its operation, and which in fact is employed in the same manner as any ordinary driver tool, but which reliably assures its release from the insert upon starting to turn the driver tool in unscrewing direction, and affords such assurance regardless how tight the tool may have become locked to the insert in the installation operation, so that the tool may be removed without the slightest tendency to loosen, much less to unscrew the tightly installed insert.

In the accompany drawings in which is shown one of various possible embodiments of the several features of the invention, Fig. 1 is a fragmentary view in longitudinal cross section showing the relation of a preferred form of tool to the insert and the structure in which that insert is about to be installed, Fig. 2 is a perspective view showing the relation of the parts in the course of installation of the insert, Fig. 3 is a side elevation, partly in section, showing the insert in place and the position of the tool as it is about to be withdrawn, and Fig. 4 is a transverse sectional view taken on line 4—4 of Fig. 1.

The invention is more especially concerned with a driver tool for the convenient installation of a self-tapping screw mounting insert of hard metal intended for introduction into soft metal and plastic structures. One preferred form of such insert to which the tool has particular applicability is that made the subject of U. S. Patent No. 2,455,885, issued December 7, 1948, to Erich G. Theurer. The insert in its general outline comprises a tubular member 10 of steel, preferably hardened steel, transversely slotted at 11 at its entry end across its external threads 12 to form cutters at the advance edges of such slot for gouging the metal or plastic from the smooth generally cylindrical bore 13 in the structure S to which the insert is to be applied, so that the insert will tap into the smooth bore a thread 14 which is snugly conformed to thread 12 of the insert 10 for secure accommodation in the structure S. The insert 10 is tubular in form as shown and its bore is tapped at 15 for the purpose of accommodating the correspondingly threaded end 16 of the driver tool used in installing such insert and after removal of such tool to accommodate the screw (not shown) for which the insert is to afford a secure anchor in the soft metal or plastic structure S in which the insert is accommodated. While the insert is shown as of the headless variety, it may if desired be provided with a head such as shown in the embodiment illustrated in the patent above identified.

The driver tool shown in the drawings comprises a shank 17 which may have a keying upper end 18 to which may be applied a suitable handle (not shown) for operating the tool.

The tool also presents a reaction face 19 which engages the outer extremity of the insert when threaded as far as it will go upon threaded end 16, so that during torque transmission for installation of the insert, as indicated in Fig. 2, there will be no rotary displacement of the insert relative to the shank.

If the threaded shank end 16 precluded all lost motion, not only while driving the insert into place, but also in unscrewing for removal of the driver, then since the torque exerted in performing the tapping operation frequently results in locking the tool securely to the outer extremity of the insert, such insert may move as a unit with the tool in tool release operation and accordingly becomes loosened from the structure in which it had been installed and backs out from such structure in the release movement of the driver.

According to the present invention, this difficulty is completely obviated by introducing a tool release transmission T between the operating shank and the exposed face of the installed insert, which transmission does not interfere with the installation of the insert but affords sufficient play in commencing reverse or removal turn of the driver to release it from the insert, so that it is readily screwed out of the insert without impairing the security with which the insert had been lodged into the structure.

According to the invention in a preferred embodiment, the driver tool release transmission comprises two coacting coupling members 20 and 21 which encompass the operating end of the driver tool shank. The upper coupling member is preferably a drive disk 20 rigidly affixed to the shank and the lower or driven coupling member is a tool release collar 21 movably mounted with respect to the shank and has the thrust face 19 that engages the exposed end of the insert 10. Interposed between the two coupling members is a low friction thrust bearing 22, preferably a ball bearing encompassing the shank and spacing the two coupling members as at 23.

For operating the driven or tool release collar 21 from the driving or drive disk 20, a set of lugs, desirably two diametrically opposed lugs 24 protrude downward from the face of the drive disk 20 and two associated lugs 25 also diametrically opposed to each other protrude upward from the release collar 21. Lugs 24 and 25 which are preferably integral with the respective coupling members, are of width in circumferential direction such, that in the assembly there is substantial clearance at 26 between the corresponding lugs of the two coupling members. Moreover, the height of these lugs is somewhat less than the thickness of the anti-friction or ball bearing 22 so that, as shown, the free end of each lug is maintained somewhat spaced from the face of the opposed coupling member to afford the spacing 23 above referred to.

In a preferred embodiment shown, the respective coupling members are of cylindrical stock. The lugs 25 on the driven coupling are formed by milling a circular trough 27 into the upper face of the release collar 21 and milling away a segment 28 diametrically across the mid section of the rim thus formed. The lugs 24 on the driving coupling 20 are similarly formed by milling a circular trough 29 into one face thereof and milling away lateral segments 30 and 31 of the resultant upstanding rim. The three segments 28, 30 and 31 are of width such as to leave the desired clearance as at 26 between the associated driving and driven edges 32 and 33 of lugs 24 and 25, respectively, when the parts are in the position shown in Fig. 3. Accordingly the two coupling members of the release transmission in effect constitute a cylindrical casing of which the coacting opposed driving and driven lugs 24 and 25 form the median wall portion for accommodating the ball bearing 22 therein.

The driven or release coupling member 21 is preferably mounted in position by a flexible hanger or connection to the driving coupling member or drive disk 20. This hanger connection may if desired be a pair of coil springs 34 extending longitudinally of the device, anchored at one end to the side wall of drive disk 20 and at the other to the side wall of release collar 21. Suitable drive fasteners 35 in the respective coupling members headed at 36, or if desired ordinary screws may serve for anchorage of these springs.

For convenience and simplicity of construction, the release transmission T may be mounted on a rod extension of the shank, which is desirably a separate rod R securely anchored in a corresponding socket 37 in the lower end of the shank 17. The drive disk 20 in such embodiment may be securely threaded upon the rod, firmly to engage the end 38 of the main shank for rigid connection thereto. The release collar 21 has a bore 39 therethrough which has slight clearance about the rod R and is free to move thereon. The extremity of the rod as above indicated, protrudes beyond the release collar 21 to serve as the mount 16 for releasably holding the threaded insert 10 to be installed. For convenience rod R is desirably threaded from end to end, as shown.

In operation the self tapping insert 10 is first screwed upon the protruding end 16 of the rod R and then brought into registry with the untapped opening 13 in the structure S into which it is to be introduced and applied, desirably in a suitable jig while turning the shank 17 of the driver tool, in which operation the thrust disk lugs 24 will first engage at each driving edge 32 the corresponding driven edge 33 of lugs 25 on release collar 21, as shown in Fig. 2, and the insert will tap its way into the structure by torque directly transmitted from the shank 17, thrust being at the same time applied against the insert through face 19 of the release collar 21. The release transmission T does not interfere with this operation, since release collar 21 is driven from lugs 24 of the thrust disk to turn as a unit with the shank as the insert is screwed into place. When the insert has been threaded home, the driver tool is turned in opposed direction, as shown in Fig. 3, to remove it. Let it be assumed that as a result of the high torque exerted in installation, the collar 21 has become tightly locked to the exposed face of the insert 10. In now turning the driver tool in reverse direction for the purpose of removing it, it is clear that the drive disk 20 will move with little friction upon the ball bearing 22 so that its lugs 24 will move through the gap 26 to engage the rear edge 32' of lugs 24 with edge 33' of lugs 25. In this movement, the shank 17 and with it the rod R are turned through a small fraction of a revolution in unscrewing direction so that the entire tool including the thrust disk 20 and release collar 21 are lifted by a small fraction of an inch, whereby collar 21 disengages the exposed end of the installed insert 10 without imposing any loosening strain whatsoever upon such insert. Thus any lock of the release collar to the insert is broken and thereupon the tool may be threaded out of the insert with ease. Accordingly, regardless how secure becomes the lock between the tool and the insert in the installing operation, the tool is removed with the greatest of ease and without impairing the security of installation of the insert within its mount.

It will be seen that the driven tool is a simple and rugged construction and that the manipulations in operating the same for installing a self-tapping insert and for thereupon removing the tool therefrom are the same as if the tool were devoid of any release instrumentality.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A quick release driver tool for the application of a self-tapping screw mounting insert into an untapped bore in metal or the like, said tool comprising a shank, a tool release collar encompassing said shank, said shank having a threaded end protruding beyond said collar for releasable screw mount of an insert thereon, a low friction thrust bearing encompassing the shank, said shank having means to press said thrust bearing against said tool release collar, and means for limiting the rotary movement of the release collar relative to the shank.

2. A quick release driver tool for the application of a self-tapping screw mounting insert to an untapped bore in metal or the like, said tool comprising a shank, a tool release collar movably encompassing said shank, said shank having a threaded end protruding beyond said collar for releasable mount of an insert thereon, and for abutment of said insert against said collar, a drive disk rigid with said shank and encompassing said shank, a low-friction thrust bearing encompassing said shank and interposed between said drive disk and said release collar and spacing them apart, means loosely attaching said release collar to said drive disk to permit relative movement therebetween, and stop means on said drive disk and said release collar coacting to limit the relative rotary movement therebetween.

3. A quick release driver tool for the application of a self-tapping screw mounting insert into an untapped cylindrical bore of metal or the like, said tool comprising a shank, a rod secured in the end of said shank and threaded at its free end for releasable screw mount of an insert, a drive disk about the rod and rigidly affixed thereto, a tool release collar about the rod, a low friction thrust bearing about the rod and interposed and maintaining a distance between said drive disk and said tool release collar, yielding means attaching said release collar to said drive disk to permit relative movement therebetween and coacting stop means on said disk and collar respectively to limit the relative rotary movement thereof.

4. A quick-release driver tool for the application of a self-tapping screw mounting insert to an untapped cylindrical bore in metal or the like, said tool comprising an operating shank having a rod threaded into the extremity thereof and protruding therebeyond, a drive disk threaded upon said rod and abutting the end of said shank, a tool release collar encompassing said rod, a low friction thrust bearing encompassing said rod and interposed between said drive disk and said release collar and maintaining said elements in spaced relation, hanger means yieldably attaching the thrust release collar to the drive disk and coacting stop means rigid respectively with the drive disk and the release collar to limit the relative rotary displacement therebetween, the extremity of the threaded rod protruding beyond the release collar and serving for releasable mount of a threaded insert to be attached.

5. A quick-release driver tool for the application of a self-tapping screw mounting insert to an untapped cylindrical bore of metal or the like, said tool comprising an operating shank, a threaded rod mounted in and protruding from the forward end thereof, a tool release transmission about said rod and in thrust relation to said shank, said rod protruding beyond said transmission for releasable mount thereon of the insert to be applied, said transmission comprising a drive disk rigid with the shank and a loosely mounted release collar about the rod and affording a thrust face to engage such insert, a low friction thrust bearing interposed between said drive disk and said release collar and maintaining the same in spaced relation, said drive disk having lugs rigid therewith extending toward the release collar and the latter having lugs rigid therewith extending toward the drive disk, said lugs on the respective transmission elements being spaced peripherally from each other to transmit torque from the drive disk to the release collar in the application of an insert and in the reverse rotation of the shank, after taking up the clearance between the drive disk and the release block to transmit torque to the latter for removal of the tool from the installed insert.

6. A quick release driver tool for the application of a self-tapping screw mounting insert to an untapped cylindrical bore of metal or the like, said tool comprising a shank, a threaded rod protruding beyond said shank, a tool release transmission comprising a driving coupling member rigid with the shank and a loosely mounted driven coupling member, flexible attachment means secured at the peripheries of the respective coupling members to maintain the loosely mounted driven coupling member assembled to the rest of the structure, said coupling members each having drive lugs rigid therewith and protruding therefrom, those of each coupling member being interposed between those of the other with clearance therebetween to permit limited rotary displacement of the driven coupling member, a ball bearing interposed between said transmission members and spacing them slightly apart, said ball bearing encompassing the rod and being encompassed by the lugs of the two coupling members, the threaded rod extending beyond the release transmission for mounting an insert, said driven coupling member presenting a thrust face for engagement with such threaded insert.

7. The combination recited in claim 6 in which the flexible attachment means comprises coil springs affixed at their ends to mounting pegs protruding from the respective coupling members.

FELIX W. BRAENDEL.

References Cited in the file of this patent

UNITED STATES PATENTS

| Number | Name | Date |
|---|---|---|
| 702,934 | Errington | June 24, 1902 |
| 1,125,186 | Schneider | Jan. 19, 1915 |
| 1,308,490 | Funk | July 1, 1919 |
| 1,664,442 | Weil et al. | Apr. 3, 1928 |
| 2,160,150 | Jimerson et al. | May 30, 1939 |
| 2,450,185 | Craven | Sept. 28, 1948 |